United States Patent

Ban

[15] 3,647,988

[45] Mar. 7, 1972

[54] MAGNETIC TAPE AUTOMATIC RECORDING APPARATUS HAVING AUTOMATIC FADE-IN AND FADEOUT

[72] Inventor: Itsuki Ban, 829 Higashi-Oizumimachi, Nerima-ku, Tokyo-to, Japan

[22] Filed: Sept. 2, 1969

[21] Appl. No.: 854,679

[30] Foreign Application Priority Data

Sept. 2, 1968 Japan....................................43/62338

[52] U.S. Cl................179/100.2 R, 179/1 VL, 179/100.2 Z, 323/66

[51] Int. Cl.......................................G11b 5/00, G11b 23/04

[58] Field of Search............179/100.2 R, 100.2 Z, 100.1 TC, 179/100.1 VL; 323/66

[56] References Cited

UNITED STATES PATENTS

| | | | |
|---|---|---|---|
| 2,551,150 | 5/1951 | McGoffin | 323/66 |
| 3,260,954 | 7/1966 | Thompson | 179/1 VL |
| 3,488,750 | 1/1970 | Fujimoto | 179/1 VL |

FOREIGN PATENTS OR APPLICATIONS

| | | | |
|---|---|---|---|
| 410,629 | 10/1966 | Switzerland | 179/1 VL |

*Primary Examiner*—Bernard Konick
*Assistant Examiner*—Raymond F. Cardillo, Jr.
*Attorney*—Jacobs & Jacobs

[57] ABSTRACT

A magnetic tape automatic recording apparatus wherein a variable resistor is provided in the recording circuit for regulating the recording level, an operating shaft is rotated by a first driving device in the direction increasing the recording level in response to the initiation of the recording, rotation of the operating shaft is prevented in response to the output of a detecting circuit detecting that the recording level has reached a predetermined value, and is effected by a second driving device in the direction decreasing the recording level in response to the termination of the recording.

8 Claims, 11 Drawing Figures

Patented March 7, 1972 3,647,988

5 Sheets-Sheet 1

ATTORNEY

Patented March 7, 1972

3,647,988

5 Sheets-Sheet 3

Patented March 7, 1972 3,647,988

5 Sheets-Sheet 5

MAGNETIC TAPE AUTOMATIC RECORDING APPARATUS HAVING AUTOMATIC FADE-IN AND FADEOUT

BACKGROUND OF THE INVENTION

The present invention relates to a magnetic tape recording apparatus, more particularly to such the automatic magnetic tape recording wherein the recording is automatically controlled to an appropriate value in response to the initiation of the recording.

In the endless magnetic tape, for instance, where a favorable recording may not be obtained due to an improper recording level, it is impossible to repeatedly effect the recording by rewinding the tape as in the manner of a magnetic tape having discrete ends, so that the recording must be very carefully controlled.

In order to eliminate such a failure derived from an improper recording level, it has been, heretofore, proposed to provide, for instance, an arrangement in which a compression circuit is incorporated in the recording circuit.

In this method, for the purpose of facilitating the recording of an input signal, higher intensity portions of the input signal were compressed and the lower intensity portion thereof were expanded. According to this method, the fidelity of the recording is lost and the record sound is flat so that such method is not entirely suitable for recording music or the like.

Therefore, another method is needed for automatically regulating the recording level into an appropriate status without providing undesirable compression in the recording circuit.

SUMMARY OF THE INVENTION

It is a principal object of the present invention to provide a magnetic tape automatic recording apparatus wherein an operating shaft of a variable resistor for regulating the recording level of the recording circuit is automatically rotated from a zero level position to an appropriate position in response to the initiation of the recording and further rotated from the appropriate position to the zero level position in response to the termination of the recording, the recording level being controlled with a so-called "fade-in" at the initiation of the recording and a so-called "fade-out" at the termination thereof.

Another object of the invention is to provide a magnetic tape automatic recording apparatus wherein rotation of the operating shaft of the variable resistor is prevented when the variable resistor is automatically set to an appropriate recording level position.

A further object of the invention is to provide a magnetic tape automatic recording apparatus which is capable of driving the magnetic tape with the initiation of the recording and of automatically stopping the magnetic tape with the termination of the recording.

Still another object of the invention is to provide a magnetic tape automatic recording apparatus wherein the operating shaft of the variable resistor is rotatably driven in one direction by rotating force of a capstan for drivingly transporting the magnetic tape and rotatably driven in reversed direction by elastic force of a coil spring coupled to the operating shaft.

These and further features, advantages and objects of the invention will become more apparent from the following description of an exemplary embodiment thereof illustrated in the drawings.

DESCRIPTION OF THE PREFERRED EMBODIMENTS

Figure 1:
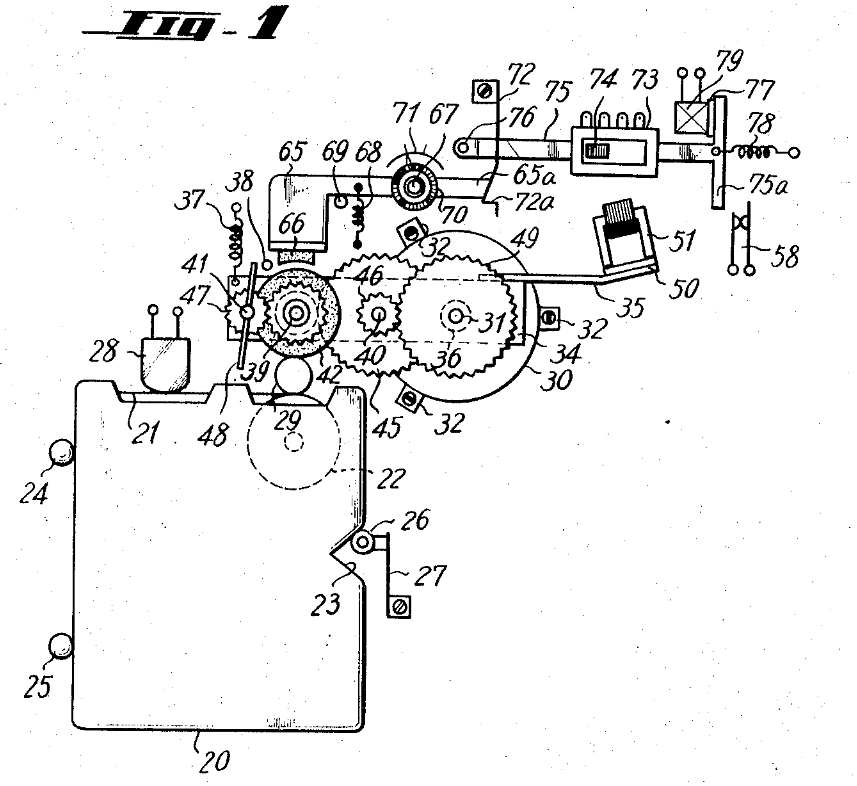
FIG. 1 is a plan view showing one embodiment of an apparatus according to the present invention.

FIG. 1 shows an apparatus according to the present invention embodied in a tape recorder utilizing an endless magnetic tape cartridge.

Numeral 20 indicates an endless magnetic tape cartridge which includes a generally rectangular housing with a centrally disposed reel assembly (not shown) on which an endless magnetic tape 21 is wound and unwound in a conventional manner. The endless tape cartridge 20 is mounted on a deck (not shown) by means of guides 24, 25, 26 provided on the deck as shown in the drawing. The guide 26 on a leaf spring 27 is pressed into a notch 23 on the side of cartridge 20. Compressive force of the spring-pressed guide 26 on an inclined wall of a notch 23 in the cartridge side urges the cartridge 20 forwardly thereby establishing a play action of the magnetic tape 21 with a magnetic head 28 and a capstan 29. The capstan 29 is rotated at a preset constant speed to transport the magnetic tape 21 at its predetermined linear playing speed. The capstan 29 firmly presses the tape 21 against a pinch roller 22 in its drive relation.

Figure 3:
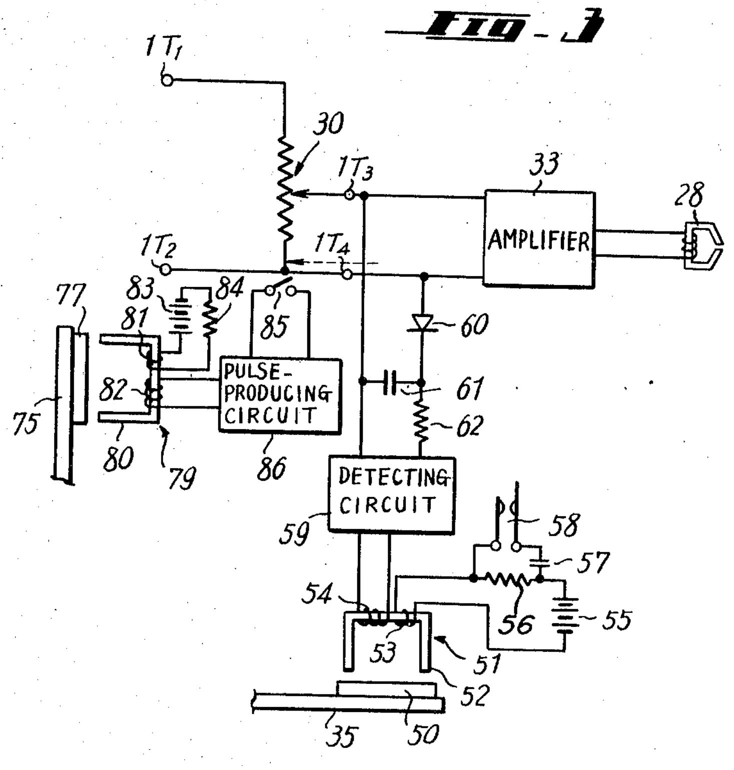
FIG. 3 is an electric circuit diagram for the apparatus shown in FIG. 1.

A variable resistor 30 is fixed on a body member (not shown) through mounting pieces 32. The variable resistor 30 is provided in a recording amplifier which amplifies a signal detected, for instance, by a microphone and furnishes an output to the recording head 28. As seen in FIG. 3, the input terminals of the variable resistor 30 are designated by $IT_1$ and $IT_2$ and the output terminals of the resistor 30 are designated by $IT_3$ and $IT_4$. The output terminals $IT_3$, $IT_4$ are connected with an amplifier 33. The output of the amplifier 33 is supplied to the recording head 28. When an input signal is furnished across the input terminals $IT_1$ and $IT_2$, a variable output is obtained between the output terminals $IT_3$ and $IT_4$ with the adjustment of the variable resistor 30. In other words, depending on the intensity of the input signal across the input terminals $IT_1$, $IT_2$, the gain control for the recording amplifier can be obtained by adjusting the variable resistor 30, and the recording level in the magnetic tape recorded through the recording head 28 can be adjusted by the variation of the variable resistor 30.

Referring back to FIG. 1, numeral 34 designates a swing lever having a leaf spring 35 at one end thereof, and is supported freely swingable around an operating shaft 31 of the variable resistor 36 through a sleeve 30, and is urged in the clockwise direction by a tension spring 37, but the swinging is blocked by a stopper pin 38. Shafts 39, 40, and 41 are rotatably mounted on the swing lever 34. Pivotally mounted on the shaft 39 are a frictional wheel 42 and gears 43, 44. Pivoted to the shaft 40 are gears 45, 46 and in turn pivoted to the shaft 41 are a gear 47 and an impeller 48. The gear 43 meshes with the gear 45 and the gear 46 meshes with a gear 49 pivotally mounted on the operating shaft 31 of the variable resistor 30. The gears 43, 45, 46 and 49 constitute a reduction gearing and rotation of the friction wheel 42 is reduced to be imparted to the operating shaft 31. On the other hand, rotation of the shaft 39 is imparted to the impeller 48 through the gears 44, 47. A magnetic piece 50 is fixed on the right-hand side of the leaf spring 35, and on the fixed portion (not shown) is secured an electromagnetic device 51 having a magnetic path with the open end facing against said magnetic piece 50. The magnetic piece 50 and the electromagnetic device 51 constitutes means for locking the swing lever 34 against elasticity of the tension spring 37. The detail of such means will be described by referring to FIG. 3.

The electromagnetic device 51 is constituted by a core 52 (FIG. 3) having a first and second coils 53, 54. The first coil 53 is connected to an electrical source 55 through a resistor 56 and is normally supplied with a relatively weak current. The intensity of the magnetic flux generated in the first coil 53 which receives a current from the source 55 via the resistor 56 is so adapted that it can attract intensely and engage with the magnetic piece 50 when the open end of the magnetic circuit of the core 52 is closed by the magnetic piece 50, but it cannot attract the magnetic piece 50 when the magnetic piece 50 is away from the core 52. The first coil 53 is supplied with the current in pulse manner via a condenser 57 and a switch 58, of which detail will be hereinafter described from the source 55 when the switch 58 is closed.

When the switch 58 is closed, a heavy pulsating current flows in the coil 53 through the capacitor 57, a large flux is generated in the coil 53, and the magnetic piece 50 on the leaf spring 35 is attracted by the electromagnetic device 51 against the elastic force of the tension spring 37 (FIG. 1). The magnetic piece 50 is maintained in a state of being attracted by and engaged with the electromagnetic device 51 by means of relatively weak current flowing through the resistor 56. A high resistance (not shown) is connected in parallel with the condenser 57 so as to discharge the latter upon opening the switch 58.

The second coil 54 is energized by an output signal of a detecting circuit 59 consisting of, for instance, a Schmidt circuit. A signal obtained between the output terminals $IT_3$ and $IT_4$ of the variable resister 30 is equilibrated by a rectifying circuit consisting of a diode 60 and then applied to the input side of the detecting circuit 59.

The detector circuit 59 is so constructed that, when it detects the fact of the input voltage being in excess of a predetermined value, an output signal is produced at the output terminals, and applied across the second coil 54 of the electromagnetic device 51. The direction of current flowing in the second coil 54 is such that it eliminates the magnetic flux generated in the first coil 53, so that when the magnetic piece 50 is attracted by the core 52, and the output current from the detecting circuit 59 flows in the second coil 54, the attraction of the magnetic piece 50 is released.

Referring back again to FIG. 1, with rotation of the swing lever 34, since the capstan 29 is provided in the area of the frictional wheel 42 which rotates with the swing lever 34, when the first coil 53 (FIG. 3) of the electromagnetic device 51 is energized and the swing lever 34 is swing against the elastic force of the spring 37, the frictional wheel 42 rotates abutting on the capstan 29. Since rotation of the frictional wheel 42 is transmitted to the operating shaft 31 of the variable resistor 30 through the reduction gearing, the operating shaft rotates against an elastic force of a coil spring 63 (FIG. 2), changing the variable resistor 30. The opposite ends of the coil spring 63 are coupled to a fixed pin 64 and the operating shaft 31 provided within the case for the variable resistor 30 to impart to the operating shaft 31 rotating force in the direction for minimizing the output signal level from the variable resistor 30.

Lever 65 (FIG. 1) having a brake member 66 made of rubber or like material at one end, is supported freely swingable around a fixed axis 64, and is urged in the counterclockwise direction by a tension spring 68, but the swinging is blocked by a stopper pin 69. A knob 70 with an index is firmly mounted to the lever 65 and a division 71 is provided in a fixed portion (not shown) to be aligned with the index. Manual rotation of the knob 70 in the clockwise direction simultaneously therewith rotates the lever 65 so that the lever 65 is brought into engagement with a locking step portion **72*a* of the leaf spring 72 at one end thereof to prevent the lever 65 from returning to its original position by elastic force of the tension spring 68**.

Numeral 73 denotes a changing switch for changing the magnetic tape from recording to nonrecording position and is provided with a knob 74 and a lever 75 coupled to the knob 74. The lever 75 projects at opposite ends from the body of the changing switch 73, and a pin 76 is fixed to one end thereof and a magnetic piece 77 is secured to the other end. The lever 75 is adapted to receive movement thereof in the rightward direction in FIG. 1 by means of a tension spring 78. With manual operation of the knob 74 for movement to a position shown in FIG. 1, the magnetic piece 77 is pulled into and attracted to an electromagnetic device 79 provided on a fixed portion (not shown) and the knob 74 and the lever 75 is prevented from their returning to respective original positions regardless of elastic force of the tension spring 78. At which time, the changing switch 73 is set to the recording condition. When the electromagnetic device 79 releases attraction of the magnetic piece 77, the lever 75 is moved by elastic force of the tension spring 78 in the rightward direction in FIG. 1 and then the pin 76 engages the leaf spring 72 to swing the leaf spring 72. If the end portion **65*a* of the lever 65 engages the step portion 72*a* of the leaf spring 72, due to the above-mentioned swing operation of the leaf spring 72, the end portion 65 is disengaged from the step portion 72*a* thereby the lever 65 is returned to its initial position by elastic force of the tension spring 68. During movement of the knob 74 and the lever 75 to the rightward, the changing switch 73 is set to the nonrecording condition. The switch 58 (FIG. 1, 3) is disposed in the area of the travelling path of the one portion 75*a* of the lever 75. The switch 58 is closed when the changing switch 73 is in the recording condition but is opened by operation of the one portion 75*a*** when the latter is in the nonrecording condition.

Now, the magnetic piece 77 and the electromagnetic device 79 which constitute the stopping device will be described in detail referring to FIG. 3. The electromagnetic device 79 is constituted by a core 80 having a first coil 81 and a second coil 82. The first coil 81 is connected to an electric source 83 through a resistor 84 and is supplied with a relatively weak current. The second coil 82 is connected to output terminals of a pulseproducing circuit 86 for generating a pulse voltage as the switch 85 is closed. The intensity of the magnetic flux produced in the first coil 81 is so adapted that it can attract intensely and engage with the magnetic piece 77 when the open end of the magnetic circuit of the core 80 is closed by the magnetic piece 77, but it cannot attract the magnetic piece 77 when the magnetic piece 77 is away from the core 80. On the other hand, the direction of current flowing in the second coil 82 is such that it eliminates the magnetic flux generated in the first coil 81, so that when the magnetic piece 77 is attracted by the core 80, and the output current from the pulse-producing circuit 86 flows in the second coil 82, the attraction of the magnetic piece 77 is released. The switch 85 actuating the pulse-producing circuit 86 is stored within the variable resistor 30 and is closed when the resistor 30 is fully rotatably returned by elastic force of the coil spring 63 (FIG. 2) to its normal position.

Figure 2:
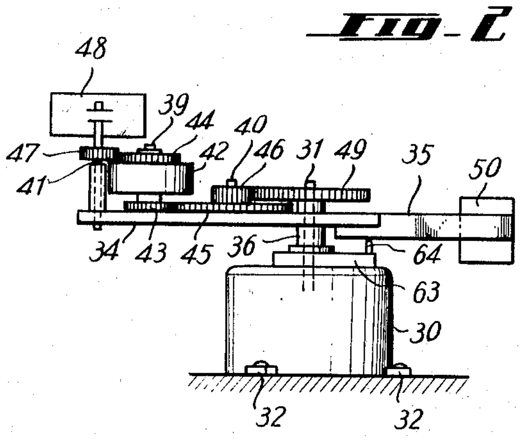
FIG. 2 is a side elevational view of the driving mechanism of the variable resistor shown in FIG. 1.

FIG. 2 is an elevational view showing the swing lever 34 shown in FIG. 1 and associated members annexed thereto. Similar numerals are used to indicate like parts in FIG. 1. FIG. 3 is a representation showing a typical circuit for operating the apparatus illustrated in FIG. 1, wherein similar numerals are used to denote like parts in FIG. 1.

Next, a general function of the apparatus shown in FIGS. 1, 2 and 3 will be hereinafter described. By manually moving the knob 74 of the changing switch 73 to a position shown in FIG.

1 against elastic force of the tension spring 78, the magnetic piece 77 on the lever 75 is caused to be attracted to the electromagnetic device 79, and thus the changing switch 73 is set to the recording condition. At this point, in response to the changing switch 73 a motor (not shown) as a drive source for the capstan 29 is supplied with a current to rotate the capstan 29 initiating transport of the tape 21 in the cartridge 20. Simultaneously with the changing switch 73 being operated for the recording condition, the switch 58 is closed to apply the pulse voltage to the first coil 53 of the electromagnetic device 51. Thus, the magnetic force is derived from the electromagnetic device 51 to attract the magnetic piece 50 on the swing lever 34 against elastic force of the tension spring 37. As a result, the swing lever 34 is swung against the elastic force of the tension spring 37, the frictional wheel 42 is urged on the capstan 29, and the magnetic piece 50 is attracted to the electromagnetic device 51, as shown in FIG. 1. The frictional wheel 42 rotates with the abutting of the capstan 29 and the operating shaft 31 of the variable resistor 30 rotates through the reduction gear train 43, 45, 46 and 49. In this instance, the operating shaft 31 is positioned beforehand by elastic force of the coil spring 63 to a zero level position (so that the output terminal $IT_3$ comes to the position shown by dotted lines in FIG. 3) thereby as the variable resistor 30 changes with the rotation of the operating shaft 31, the recording level rises gradually and is caused to so-called "fade-in." When the recording level reaches an appropriate value, an output voltage is generated between the output terminals of the detecting circuit 59 as described above, and the said output voltage is applied to the second coil 54 of the electromagnetic device 51. Therefore, a current flows in the second coil 54, and a magnetic flux is derived from the second coil. The flux derived from the first coil 53 is cancelled by this flux, the attractive engagement of the magnetic piece 50 by the electromagnetic device 51 is released, and the swing lever 34 is restored by elastic force of the spring 37. With restoration of the swing lever 34, the frictional wheel 42 retracts from the capstan 29 and abuts against the brake member 66 on the lever 65, the variation of the variable resistor 30 ceases, and after which the variable resistor 30 is set to a position of an appropriate recording level. As seen from the foregoing, a recording signal is automatically controlled to an appropriate recording level and transcribed to the magnetic tape 21 by changing over the changing switch 73 to the recording condition.

In completion of recording, the lever 65 is manually rotated by the knob 71 against elastic force of the tension spring 68 until the end portion 65*a* of the lever 65 engages with the stop portion 72*a* of the leaf spring 72. When the lever 65 is in engagement with the leaf spring 72, since the brake member 66 is away from the frictional wheel 42 and the frictional wheel 42 is able to be freely rotated, the operating shaft 31 of the variable resistor 30 is rotatably returned to its original position by coil spring 63 and is so-called "fade-out" with low level. Rotation of the operating shaft 31 for its return is slowly effected by governor action of the fly 48 coupled to the operating shaft 31 through the gear trains 49, 46, 45, 43, 44 and 47. When the operating shaft 31 is entirely returned to its initial position and the variable resistor 30 reaches zero level, the switch 85 stored within the variable resistor 30 is closed to generate the output pulse from the pulse producing circuit 86. Therefore, a current flows in the second coil 82 of the electromagnetic device 79, a magnetic flux is produced from the second coil 82. The flux generated from the first coil 81 is cancelled by two flux, the attractive engagement of the magnetic piece 77 by the electromagnetic device 79 is released, and the lever 75 is restored by elastic force of the tension spring 98. Restoration of the lever 75 allows the pin 76 on the lever 75 to engage the leaf spring 72 and to swing the leaf spring 72 releasing retention of the lever 65 thereby the lever is returned to its normal position by elastic force of the tension spring 68. Due to restoration of the lever 75, a motor (not shown) for operatively rotating the capstan 29 is disconnected with current to arrest rotation of the capstan 29 and transport of the magnetic tape 21 at the same time.

As set forth in the foregoing, in accordance with the apparatus shown in FIGS. 1, 2 and 3, the recording is automatically made on the magnetic tape 21 at the appropriate recording level.

Figure 4:
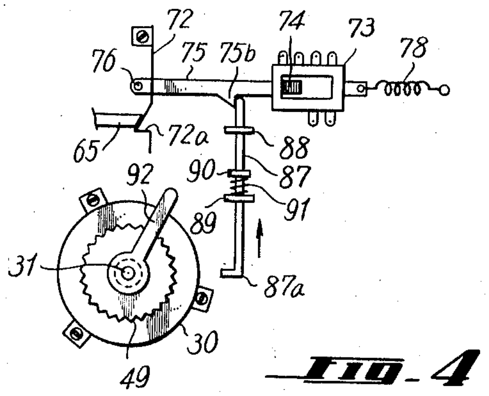
FIG. 4 is a representation showing retainer means which may be used in place of retainer means for the changing switch shown in FIG. 1.

FIG. 4 shows a mechanism for mechanically establishing retention of the changing switch 73 in FIG. 1 in place of the electromagnetic mechanism. Similar numerals are used to illustrate like parts in FIG. 1.

In FIG. 4, the lever 75 of the changing switch 73 is provided with a projection part 75*b* at one edge. At the one edge of the lever 75 is abutted the tip end of a slide rod 87 provided with a bent portion 87*a* at one end and supported slidably by means of guides 88, 89. Provided between a ring member 90 secured to the slide rod 87 and the guide 89 is a spring 91 of which elastic force urges the slide rod 87 to a position where the tip end is in contact with the lever 75. A lever 92 is fixed at one end to the operating shaft 31 of the variable resistor 30 and the lever 92 is rotated with rotation of the operating shaft 31. In the region of the lever, the bent portion 87*a* of the slide rod 87 is positioned. In the condition that the operating shaft 31 of the variable resistor 30 is urged by elastic force of the coil spring 63 (FIG. 2) to a position where the recording level reaches the zero level, the lever 92 engages the bent portion 87*a* of the slide rod 87 to allow the latter to keep away from the lever 75 against elastic force of the spring 91. Consequently, the lever 75 is moved by elastic force of the tension spring 78 to the rightward direction in FIG. 4 and the changing switch 73 is brought into the nonrecording condition.

In the recording, the knob 74 of the changing switch 73 is manually moved to a position shown by FIG. 4, and then the operating shaft 31 of the variable resistor 30 is rotated in the counterclockwise direction thereby the lever 42 is retracted from the bent portion 87*a* of the slide rod 87. With this, the slide rod 87 is moved by elastic force of the spring 91 and the tip end engages the one edge of the lever 75. Then, operation of the knob 74 is released so that the lever 75 is attempted to be returned to its original position by elastic force of the spring 78, however, restoration of the lever is prevented by engagement of the projection part 75b with the slide rod 87, as shown in FIG. 4. Accordingly, the changing switch 71 is maintained in a position as set to the recording condition. Upon completion of the recording, the operating shaft 31 of the variable resistor 30 is returned to its original position by elastic force of the spring 63 and thus the slide rode 87 is slided against elastic force of the spring 91 thereby engagement of the projection part 75*b* with the tip end of the rod 87 is released. As a result, the lever 75 is restored to its initial position by elastic force of the tension spring 78 to change over the changing switch 73 to the nonrecording condition. As mentioned in the foregoing, it is apparently understood that the mechanism shown in FIG. 4 performs the same function as the electromagnetic device 79 and the magnetic piece 77.

Figures 5, 6, 7:
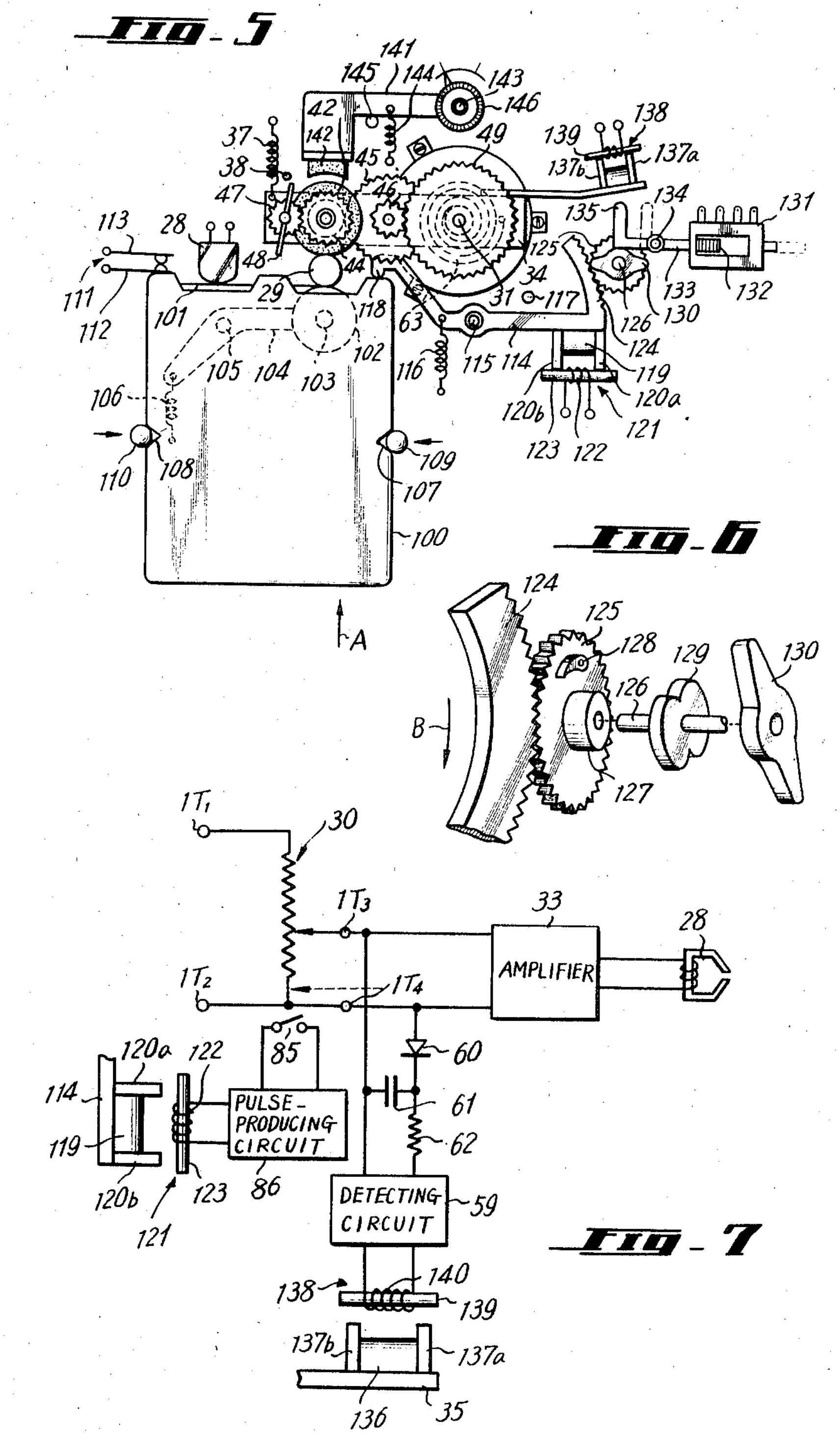
FIG. 5 is a plan view of another embodiment of the apparatus according to the present invention.
FIG. 6 is an enlarged exploded perspective view of the cam and the drive mechanism therefor shown in FIG. 5.
FIG. 7 is an electric circuit diagram for the apparatus shown in FIG. 1.

FIGS. 5 to 7 shows another embodiment different from that of the recorder according to the invention shown in FIGS. 1 to 3. The details of the embodiment will be hereinafter described. For the purpose of facilitating understanding, similar numerals are used in FIG. 5 to FIG. 7 to illustrate like parts in FIGS. 1 to 3.

The recorder contains a slot or tunnel opening (not shown) into which an endless tape cartridge 100 is readily inserted for recording. The cartridge 100 includes a generally rectangular housing with a centrally disposed reel assembly (not shown) on which an endless magnetic tape 101 is wound and unwound in a conventional manner. For driving the tape 101, there is provided a driving capstan 29 which extends perpendicular to the path of movement of the tape and which engages the tape for pulling the tape across or past the recording head 28. The cartridge 100 includes a pinch roller 102 journaled on an upstanding pin or shaft 103 carried by the plate 104. The plate 104 is supported freely swingable around a fixed pin 105, and is urged in the counterclockwise direction by a spring 106.

Insertion of the cartridge 100 from the direction shown by arrow A into the "record position" causes the retention member 109, 110 to be received in notches 107, 108, respectively, on the sides of cartridge 100. The retention members 109, 110 are urged in the direction of the arrow by the spring on a deck (not shown) on which the cartridge 100 rests. In this manner, the cartridge 100 is ensured to be in the "record position." When the cartridge 100 is in the "record position," the tape 101 engages the head 28 and the pinch roller 102 abuts against the capstan 29 by elastic force of the spring 106.

Electrical switch 111 has a movable contact 112 that is actuated by the one corner of the cartridge 100 when in the "record" position, as shown. When the movable contact 112 is thus closed on fixed contact 113, a motor (not shown) for rotatably driving the capstan 29 is energized to transport the endless magnetic tape 101. When the cartridge 100 is removed from the "record" position, the movable contact 112 and the fixed contact 113 are opened to disconnect the motor with current.

Numeral 114 designates a lever member, and is pivoted rotatable on a pin 115, and is urged in the counterclockwise direction by a spring 116, but the rotating is blocked normally a stopper pin 117. The one end portion 118 of the lever 114 is urged against the leading edge of the cartridge 100 when the cartridge is inserted and is rotated from the normal or first position to a second position (the position shown in FIG. 5). Thus, the lever member 114 is magnetically retained in its second position.

Namely, on the lever member 114, there are fixed a permanent magnet 119 and the yokes 120a, 120b thereof, and opposed therewith an electromagnetic device 121 wound with a coil 122 on the steel plate 123 fixed on a fixed portion (not shown). Rotation of the lever member 114 to the second position causes the yokes **120*a*, 120b of the permanent magnet 119 to close its magnetic circuit by the steel plate 123 and be attracted and engaged thereto. When an output from the pulse-producing circuit 86 shown in FIG. 7 is applied to the coil 122, since the magnetic flux produced from the coil 122 has a direction cancelling the magnetic flux due to the permanent magnet 119, the magnetic attraction between the yokes 120*a*, 120*b* and the steel plate 123 is released, and the lever member 114 is restored to the first position by elastic force of the spring 116. In restoration of the lever member 114, the leading edge of the cartridge 100 is urged by the one end portion 118 is removed from the "record" position thereby the switch 113 is opened to prevent rotation of the capstan 29**.

The lever member 114 includes an arc-shaped toothed portion 124 which mesh with a gear wheel rotatably provided on a shaft 126 through a sleeve 127 (FIG. 6). A pawl 128 (FIG. 6) mounted on the gear wheel 125 is yieldingly urged by a spring (not shown) into engagement with a ratchet wheel 129 (FIG. 6) on the shaft 126 so that counterclockwise rotation of the gear wheel 125 will drive the ratchet wheel 129 having two teeth. Accordingly, the shaft 126 is half rotated in the counterclockwise direction at each time the toothed portion 124 is rotated in the direction of arrow B In FIG. 6. A cam 130 is firmly mounted to the shaft 126 and abuts against a L-shaped lever 135 swingably pivoted through a pin 134 to a lever 133 of the changing switch 131. The changing switch 131 is similar to the switch 73 (FIG. 1) and is provided for changing between the recording and nonrecording positions and is adapted to be in the recording position when the knob 132 is in the left-hand position as shown. The lever 135 accepts the counterclockwise rotating force by elastic force of a spring (not shown) and engages with the cam thereby. When the changing switch 131 is changed to the recording condition, the lever 135 is occupied in a position shown by the solid line and is caused to effect one reciprocal swing by the cam 130 when half rotated. The lever 135 swung clockwise by the cam 130 abuts against the leaf spring 35 of the swing lever 34 to swing the swing lever 34 against elastic force of the tension spring 37. With this swing of the swing lever 34, the frictional sheel 42 abut against the capstan 29 and yokes **137*a*, 137*b* of a permanent magnet 136 secured to the leaf spring 35 is attracted to a steel plate 139 of an immovable electromagnetic device 138. Accordingly, the swing lever 34 is retained by magnetic attraction between the yokes 137*a*, 137*b* and the steel plate 139 to a position where the frictional wheel 42 abuts against the capstan 29. Rotation of the frictional wheel 42 driven by the capstan 29 is transmitted to the operating shaft 31 of the variable resistor 30 through the speed reducing gear train 43, 45, 46 and 49, the operating shaft 31 rotates against elastic force of the coil spring 63**.

The electromagnetic device 138 is fixed to a fixed portion (not shown) and to the steel plate 139 a coil 140 is wound. When an output from the detecting circuit 59 (FIG. 7) is applied to the coil 140, since the magnetic flux produced from the coil 140 has a direction cancelling the magnetic flux due to the permanent magnet 136, the magnetic attraction between the yokes **137*a*, 137*b* and the steel plate 35 is released. Thus, retention of the swing lever 34 is released and restored by elastic force of the tension spring 37, while the frictional wheel 42 is away from the capstan 29 and engages in turn a brake member 142 on a lever 141 thereby free rotation of the frictional wheel 42 is prevented. The level 141 is supported swingable around an axis 143, and is urged in the counterclockwise direction by a stopper pin 145. A knob 146 attached to the lever 141 is manually rotated to rotate the lever 14 in the clockwise direction against elastic force of the spring 142 allowing the brake member 142 to keep away from the frictional wheel 42 thereby the frictional wheel 42 is free rotatable to rotatably restore the operating shaft 31 of the variable resistor 30 by elastic force of the coil spring 63. Upon completion of restoration of the operating shaft 31, the switch 85 (FIG. 7) stored within the variable resistor 30** is closed.

Next, the made of operation as to the recorder shown in FIGS. 5 to 7 will be described hereinafter.

When the cartridge 100 is inserted in the direction of arrow A and disposed in the "record" position, the switch 112 is closed to initiate rotation of the capstan 29 to transport the tape 101 and the lever member 114 is rotated against elastic force of the spring 116 from the above-mentioned first position to the second position and retained at the second position by magnetic attraction of the yokes **120*a*, 120*b* and the steel 123. On the other hand, the lever 135 of the changing switch 131 in the recording position is rotated by the cam half rotated with rotation of the lever member 114 and the swing lever 34 is rotated by depression of the lever 135 against elastic force of the tension spring 37. Further, the lever 135 is retained by magnetic attraction of the yokes 137*a*, 137*b* and the steel plate 139 to allow the frictional wheel 42 to be rotated when depressed by the capstan 29**. In this case, the component parts arranged in each position are shown in FIG. 5.

With rotation of the operating shaft 31 of the variable resistor 30 as the frictional wheel 42 is rotated, the recording level rises gradually and is caused to so-called "fade-in." When the recording level reaches to an appropriate value, an output voltage is generated between the output terminals of the detecting circuit 59, and said output voltage is applied to the coil 140 of the electromagnetic device 138. Therefore, a current flows in the coil 140, a magnetic flux is produced from the coil 140. This magnetic flux cancels the magnetic flux due to the permanent magnet 136, and the swing lever 34 is restored by elastic force of the spring 37. With the restoration of the swing lever 34, the frictional wheel 42 retracts from the capstan 29 and is abutted against the brake member 142, the variation of the variable resistor 30 ceases, and the variable resistor 30 is set to a position of an appropriate recording level.

For ready to complete the recording, the knob 146 is manually rotated in the clockwise direction to rotate the lever 141 against elastic force of the tension spring 144 keeping the brake member 142 away from the frictional wheel 42 thereby the operating shaft 31 of the variable resistor 30 is rotatably restored by elastic force of the coil spring 63. After completion of restoration of the operating shaft 31, the recording level reaches the zero level with the switch within the variable resistor 30 being closed, and an output voltage is generated between the output terminals of the pulse-producing circuit 86, and said output voltage is applied to the coil 122 of the electromagnetic device 121. Therefore, the magnetic attraction between the yokes 120*a*, 120*b* and the steel plate 123 of the electromagnetic device 121, and the lever member 114 is restored to the first position by elastic force of the spring 116. The lever member 114 is returned to the first position at the same time the leading edge of the cartridge 100 is depressed by the portion 118 of the lever member 114 to keep the cartridge 100 away from the "record" position opening the electrical switch 111 and to stop rotation of the capstan thereby the recording of the endless magnetic tape 101 is completed.

Figure 8:
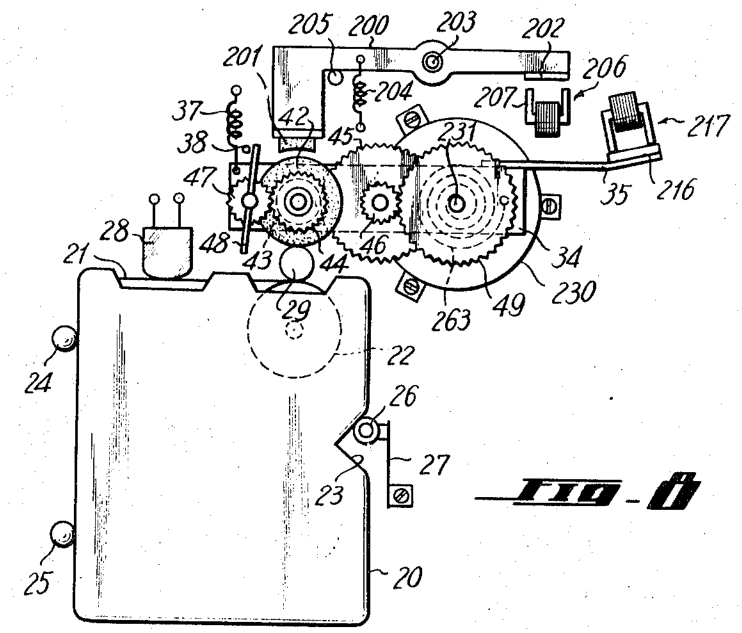
FIG. 8 is a plan view showing further embodiment of the apparatus according to the present invention.
Figure 9:
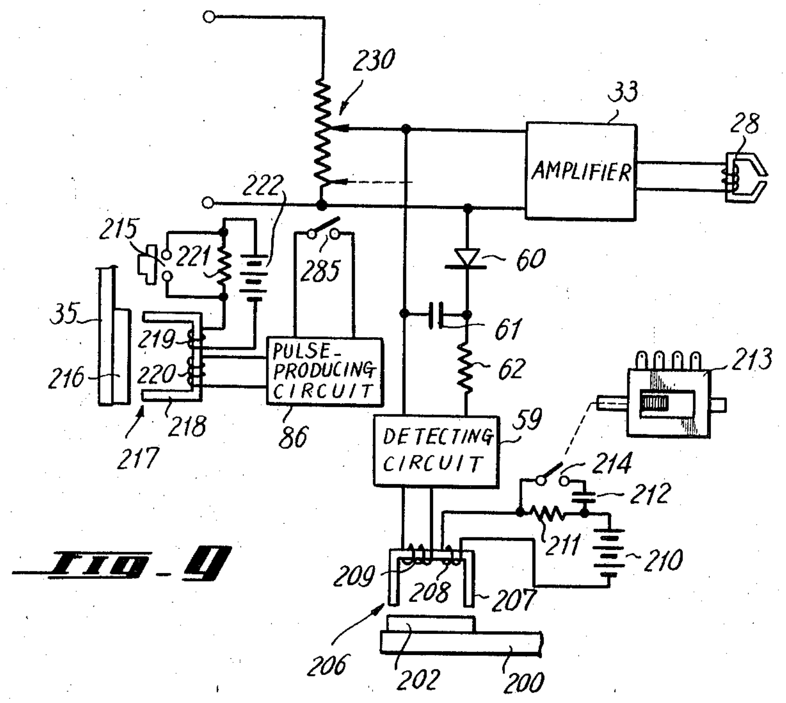
FIG. 9 is an electric circuit for the apparatus shown in FIG. 8.

Still another embodiment of the recorder according to the present invention, which differs from the embodiment as described is shown in FIGS. 8 and 9. The details of this embodiment will be described hereinafter.

For purpose of better understanding, similar numerals are used to illustrate like parts in FIGS. 1 to 7.

Numeral 200 designates a L-shaped lever having a brake member 201 at one end thereof, a magnetic piece 202 at the other end, and is pivoted swingable to a pin or shaft 203, and is urged in the counterclockwise direction by a spring 104, but the swing is blocked by a stopper pin 105. The brake member 201 normally abuts against the frictional wheel 42 when the swing level 34 is restored by elastic force of the tension spring 37, however, it may be away from the frictional wheel 42 by rotation of the lever 200 when the magnetic piece 202 is pulled and attracted to an electromagnetic device 206. The electromagnetic device 206 has the same arrangement or structure similar to that of the electromagnetic devices 51, 59 (FIG. 3) and is constituted by a core 207 on which two sets of the first and the second sets of coils 208, 209 are wound, said coils 208, 209 having an electrical wiring as shown in FIG. 9. Namely, the first coil is connected to a source 210 through a resistor 211 or a series circuit of a capacitor 212, a switch 214. The second coil 209 is connected to the output terminals of the detecting circuit 59. The switch 214 is included in a changing switch 213 for effecting a change from recording to nonrecording and is adapted to be closed when the changing switch 213 is changed to the recording condition. When the switch 214 is closed simultaneously with the changing of the switch 213, a heavy current flows pulsatingly in the first coil 218 through the capacitor 212, a large magnetic flux generates from the coil 208, and the magnetic piece 212 is attracted by the electromagnetic device 206 against the elastic force of the spring 214. After which the magnetic piece 212 is maintained in a state of being attracted by and engaged with the electromagnetic device 206 by means of relatively weak current flowing through the resistor 211. Since the capacitor 212 is discharged when the switch 214 is opened, the capacitor 212 is so arranged to be connected in parallel with a high resistor (not shown).

When the lever 200 is retained by the electromagnetic device 206 and the brake member 201 is away from the frictional wheel 42 to allow the frictional wheel to be freely rotated and an operating shaft 231 of a variable resistor 230 is rotatably driven by elastic force of a coil spring 263. The variable resistor 230 not similar to the variable resistor 30 (FIG. 1, FIG. 5) is adapted to allow the recording level to be decreased when the operating shaft 231 is clockwise rotated. That is, when the operating shaft 31 is rotatably driven by the coil spring 263 to cause the variable resistor 230 to be varied in the direction increasing the recording level thereby the recording level rises gradually and is caused to so-called "fade-in." When the recording level reaches to an appropriate value, an output signal is generated from the detecting circuit 59, and said output signal is applied to the second coil 209 of the electromagnetic device 206. Therefore, a current flows in the second coil 209, a magnetic flux is produced from the second coil 209. The flux generated from the first coil 208 is cancelled by this flux, the attractive engagement of the magnetic piece 202 by the electromagnetic device 206 is released, and the lever 200 is restored by elastic force of the tension spring 204. With restoration of the lever 200, the brake member 201 abuts on the frictional wheel 42, the variation of the variable resistor 230 ceases, and after which the variable resistor 230 is set to a position of an appropriate recording level. Consequently, the recording level is automatically established to the appropriate level by changing the changing switch 213 to the recording condition so that the magnetic tape 21 in the cartridge 20 is recorded.

For stopping the recording, a pushbutton switch 215 (FIG. 9) is operatively depressed for its closing so that a magnetic piece 216 fixed to the leaf spring 35 of the swing lever 34 is attracted to an electromagnetic device 217 and the swing lever 34 is then engaged at a position where the frictional wheel 42 is contacted with the capstan 29. The frictional wheel 42 rotates with abutting of the capstan 29, the operating shaft 231 of the variable resistor 230 rotates through the reduction gear train 43, 45, 46 and 49. When the operating shaft 31 is rotated by rotating force of the capstan 29, the variable resistor 29 which is different in a manner in the case of FIGS. 1 and 5 varied in the direction decreasing the recording level. The electromagnetic device 217, as shown in FIG. 9, comprises a core 218 and a first and second coils 219, 220 wound thereto, the first coil 219 being connected through the pushbutton switch 215 or a resistor to a source 222 on one hand, the second coil 220 being connected between the output terminals of the pulse-producing circuit 86. Closing of the pushbutton switch 215 by operatively depressing it to allow a heavy current to pass through the first coil 219 generating a large magnetic flux from the coil, as previously mentioned, and the magnetic piece 216 is attracted by the electromagnetic device 217 against elastic force of the tension spring 37. After releasing operation of the pushbutton switch 215, the magnetic piece 216 is maintained in a state of being attracted by and engaged with the electromagnetic device 217 by means of relatively weak current flowing through the resistor 221. When the operating shaft is fully restored by rotation of the capstan 29, the switch 285 within the variable resistor 230 is closed so that an output voltage is generated from the pulse-producing circuit 86, and said output voltage is applied to the second coil 220 of the electromagnetic device 217. Therefore, a pulse current flows in the second coil 220, a magnetic flux is produced from the coil 220. The flux generated from the first coil 219 is cancelled by this flux, the attractive engagement of the magnetic piece 216 by the electromagnetic device 217 is released, and the swing lever 34 is restored by elastic of the tension spring 37.

From the foregoing description, it is readily understood that the recorder shown in FIGS. 8 and 9 performs the same automatic recording operation as that of the recorder in FIGS. 1 to 7.

Figure 10:
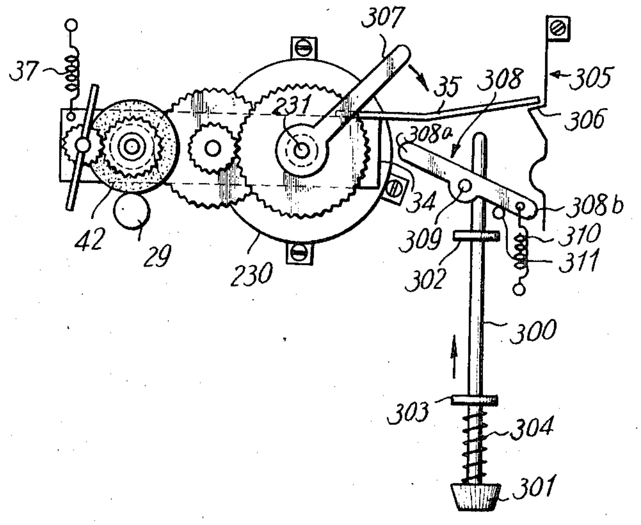
FIG. 10 is a representation showing a mechanism for mechanically effecting swing and retention of the swing lever shown in FIG. 8.

FIG. 10 shows a mechanism for mechanically retaining the swing lever 34 shown in FIG. 8. Similar numerals are used to illustrate like parts in FIG. 8.

On the side surface of the leaf spring 35 is abutted the tip end of an elongated rod 300 provided with a pushbutton 301 at one end and supported slidably by means of guides 302, 303. The rod 100 is urged by a spring 304 in the direction that the tip end is away from the leaf spring 35 and is normally remote therefrom. When the pushbutton 301 is pressed against the spring 304, the swing lever 34 and the leaf spring 35 are swung against elastic force of the spring 37, the frictional wheel 42 is urged on the capstan 29, and the one end of the leaf spring 35 is engaged by the projecting hook portion 306 of a catch member 305 made of leaf spring. Therefore, the swing lever 34 is engaged at a position where the frictional wheel 42 is contacted with the capstan 29 even after the pushbutton 301 is released. FIG. 10 shows these circumstances as above.

By allowing the frictional wheel 42 to abut against the capstan 29, rotating force of the capstan 29 is transmitted through the reduction gear train to the operating shaft 231 of the variable resistor 230 to rotate the operating shaft 231 in the clockwise direction. A lever 307 is secured to the operating shaft 231 and is rotated with the operating shaft 231 in the direction of the arrow. In the area of rotating of the lever 307 one end 308*a* of a lever 308 pivoted to a pivot 309 is disposed. The lever 308 is given rotation force in the clockwise direction by a spring 310, however, rotation of the lever 308 is prevented by a stopper pin 311. If the operating shaft 231 is rotated to a position until it allows the recording lever to be the zero level, the lever 307 engages the one end 308*a* of the lever 308 to rotate the lever 308 against elastic force of the spring 310. At this time, the other end 308*b* of the lever 308 abuts against a portion of the catch member 305 to swing it so that hook portion 306 is away from the one end of the leaf spring 35 and the swing lever 34 is restored by elastic force of the tension spring 37.

As mentioned in the above, the mechanism shown in FIG. 10 performs the same function as that of the electromagnetic device 217 in FIG. 8.

Figure 11:
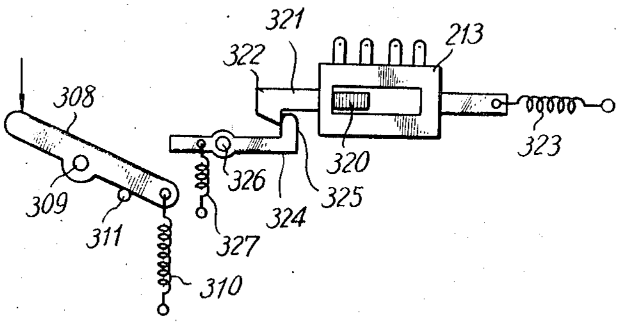
FIG. 11 is a representation showing a mechanism for automatically restoring the changing switch shown in FIG. 9 to the nonrecording condition at the termination of the recording.

FIG. 11 is a representation showing a mechanism wherein the changing switch 213 in FIG. 9 is automatically changed from the recording to nonrecording condition in response to the termination of the recording. The changing switch 213 includes a knob 320 and a slide liver 321 which is integral with the knob 320 and of which one end is provided with a detent pawl 222 fixed thereto. The slide lever 321 is urged by a spring 323 in the rightward direction and the changing switch 213 is changed to the nonrecording condition. When the slide lever 321 is manually slided by the knob 320 against elastic force of the spring to allow the detent pawl 322 to engage a bent portion 325 of a lever 324 which is pivoted to a pivot 326 and given counterclockwise rotation force by means of a spring 327. Accordingly, the changing switch 213 is maintained in such a state that it is changed to the recording condition. This state is illustrated in FIG. 11. Now, the lever 308 similar to that shown in FIG. 10 is depressed in the direction of the arrow by the lever 307 (FIG. 10) rotatable with the operating shaft 231 (FIG. 10) to rotate the lever 308 in the counterclockwise direction and one end thereof abuts against the lever 324 to rotate it against elastic force of the spring 327. Due to rotation of the lever 324, disengagement between the bent end portion 325 and the detent pawl 322 is established to restore the slide lever 321 by elastic force of the spring 323. As described in the above, in accordance with the mechanism in FIG. 11, the changing switch 213 may be automatically changed from the recording condition to the nonrecording condition in response to the termination of the recording.

The automatic magnetic tape recording apparatus according to the present invention has just been described above, but it will be understood that the present invention is not limited to the example shown in the drawings, but various changes and modifications will be made without departing from the true spirit and scope of the present invention as defined by the appended claims.

What is claimed is:

1. A magnetic tape automatic recording apparatus which includes tape driving means having a rotary drive capstan for drivingly transporting the magnetic tape and a recording circuit including a magnetic head, comprising: a variable resistor provided in said recording circuit, said variable resistor having a rotatable operating shaft by whose rotation the recording level of the signal recorded on the magnetic tape through the magnetic head may be varied; a first driving means for rotatably driving the operating shaft of the variable resistor in the direction increasing the recording level, said first driving means being adapted to be actuated in response to initiation of the recording; maintenance means for maintaining the first driving means in the actuated condition; a detecting circuit provided in the recording circuit for generating an output signal when the recording level reaches a predetermined value, the maintenance means being deactivated in response to said output signal, whereby said first driving means stops; a stop means for preventing the operating shaft from free rotation thereof simultaneously with deactivation of the maintenance means, the variable resistor being maintained by the operation of said stop means in the condition where the recording level at the predetermined value; and a second driving means for rotatably driving the operating shaft of the variable resistor in the direction decreasing the recording level, said second driving means being adapted to be operated in response to the termination of the recording, said stop means being adapted to allow the operating shaft to be freely rotated in response to termination of the recording, whereby the operating shaft is rotated by the second driving means to a position where the recording level reaches a zero level.

2. A magnetic tape automatic recording apparatus in accordance with claim 1 wherein the first driving means includes a coil spring connected to the operating shaft of the variable resistor, said coil spring being adapted to store its energy when the operating shaft is rotated by the second means, and the second driving means comprises a pivotable swing lever, a rotatable friction wheel on the swing lever and adapted to be rotatably driven against the capstan, the swing lever being arranged to swing said frictional wheel into and out of engagement with said capstan, a speed reducing gear train on the swing lever to reduce rotation of the frictional wheel and for transmitting rotation thereof to the operating shaft, and a spring urging the swing lever in the direction that the frictional wheel is away from the capstan.

3. A magnetic tape automatic recording apparatus in accordance with claim 1 wherein the first driving means comprises a pivotable swing lever, a rotatable frictional wheel on the swing lever and adapted to be rotatably driven in abutment against the capstan, the swing lever being arranged to swing said frictional wheel into and out of engagement with said capstan, a speed reducing gear train on the swing lever to reduce rotation of the frictional wheel and for transmitting rotation thereof to the operating shaft, and a spring means urging the swing lever in the direction that the frictional wheel is away from the capstan, said maintenance means being arranged to maintain said frictional wheel against the elastic force of the spring means in a position where it engages the capstan.

4. A magnetic tape automatic recording apparatus in accordance with claim 3 wherein the second driving means includes a coil spring connected to the operating shaft of the variable resistor, said coil spring being adapted to store its energy when the operating shaft is rotated by the first driving means.

5. A magnetic tape automatic recording apparatus in accordance with claim 4 wherein said magnetic tape is an endless magnetic tape stored in a cartridge, a lever means for rotating the swing lever against the elastic force of the spring means, said lever means being urged away from said swing lever by a spring and being arranged to be swung by a cartridge against the elastic force of the spring to rotate said swing lever when the cartridge is positioned in a predetermined recording position, a cam rotatable by the swing of the lever means, an actuating lever for changing the mode of the recorder between recording and nonrecording and swingable by the cam, a magnetic body member on said lever means and an electromagnetic device immovably opposing the magnetic body member so arranged that attraction of the magnetic body member by the electromagnetic device retains the lever means against movement by said spring, said frictional wheel being retained by the maintenance means in a position where the frictional wheel engages the capstan while the electromagnetic device is attracted to the magnetic body member, a pulse-producing circuit for generating an output signal in response to detecting that the operating shaft of the variable resistor has rotated to the zero level position, the electromagnetic device being adapted to be energized by the output signal of said pulse-producing circuit for releasing the magnetic attraction between the magnetic body member and the electromagnetic device, and the lever means being adapted to be rotatably restored by elastic force of the spring upon release of said magnetic attraction to engage the cartridge and eject the cartridge from the recording position.

6. A magnetic tape automatic recording apparatus in accordance with claim 4 wherein the maintenance means includes a magnetic body member secured to the swing lever and an electromagnetic device immovably provided opposing said magnetic body member, said magnetic body member and said electromagnetic device being adapted to be attracted against the elastic force of the spring means whereby the swing lever is retained in a position where the frictional wheel engages the capstan, the magnetic attraction of said magnetic body member by said electromagnetic device being released when said electromagnetic device is energized in response to the output signal of the detecting circuit.

7. A magnetic tape automatic recording apparatus in accordance with claim 6 wherein said stop means comprises a pivotable lever member, a brake member on said lever member engageable with the frictional wheel when the frictional wheel is moved with the swing lever to a position away from the capstan, and a tension spring urging the lever member in the direction that the brake member engages the frictional wheel, rotation of said operating shaft of said variable resistor being prevented by abutment of the brake member with the frictional wheel, said brake member arranged to be moved away from the frictional wheel when the lever member is rotated against the elastic force of the tension spring to allow rotation of the operating shaft.

8. A magnetic tape automatic recording apparatus in accordance with claim 7 wherein said stop means includes means for rotating the lever member against the elastic force of the tension spring and for maintaining the brake member in a position that it is away from the frictional wheel, said means having a magnetic body member secured to the lever member and an electromagnetic device immovably opposing the magnetic body member so arranged that attraction of the magnetic body member by the electromagnetic device against the elasticity of the spring means retains the lever member in a position where the brake member is away from the frictional member, a pulse-producing circuit for generating an output signal in response to detecting that the operating shaft of the variable resistor has moved to the zero level position, said electromagnetic device being adapted to be energized by the output signal of the pulse-producing circuit for releasing the magnetic attraction between the magnetic body member and the electromagnetic device.

* * * * *